US011929007B2

(12) United States Patent
Kang et al.

(10) Patent No.: US 11,929,007 B2
(45) Date of Patent: Mar. 12, 2024

(54) DISPLAY DRIVING INTEGRATED CIRCUIT AND DRIVING PARAMETER ADJUSTMENT METHOD THEREOF

(71) Applicant: Novatek Microelectronics Corp., Hsinchu (TW)

(72) Inventors: Chun-Wei Kang, Hsinchu (TW); Yi-Yang Tsai, Hsinchu County (TW); Siao-Siang Liu, Hsinchu County (TW); Shih-Hsuan Huang, Keelung (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 17/885,547

(22) Filed: Aug. 11, 2022

(65) Prior Publication Data

US 2023/0206813 A1 Jun. 29, 2023

Related U.S. Application Data

(60) Provisional application No. 63/293,825, filed on Dec. 26, 2021.

(51) Int. Cl.
*G09G 3/32* (2016.01)
*G09G 3/20* (2006.01)

(52) U.S. Cl.
CPC ......... *G09G 3/2007* (2013.01); *G09G 3/2096* (2013.01); *G09G 2310/0297* (2013.01); *G09G 2320/0233* (2013.01)

(58) Field of Classification Search
CPC .. G09G 3/20; G09G 3/32; G09G 3/34; G09G 3/36; G09G 3/2007; G09G 3/2096; G09G 2310/0297; G09G 2320/0233
See application file for complete search history.

(56) References Cited

U.S. PATENT DOCUMENTS

| | | | |
|---|---|---|---|
| 10,699,625 | B2 | 6/2020 | Nonomura |
| 2003/0133243 | A1 | 7/2003 | Imamura |

(Continued)

FOREIGN PATENT DOCUMENTS

| | | |
|---|---|---|
| CN | 102314838 | 5/2014 |
| CN | 102421216 | 5/2014 |

(Continued)

OTHER PUBLICATIONS

"Office Action of Taiwan Counterpart Application", dated Jun. 13, 2023, p. 1-p. 6.

*Primary Examiner* — Chanh D Nguyen
*Assistant Examiner* — Nguyen H Truong
(74) *Attorney, Agent, or Firm* — JCIPRNET

(57) ABSTRACT

A display driving integrated circuit (IC) and a driving parameter adjustment method thereof are provided. The display driving IC includes a control circuit and a driving parameter determination circuit. The control circuit controls a current driving circuit and a scanning circuit according to a driving parameter, wherein the current driving circuit is suitable for driving multiple driving lines of a light emitting diode (LED) array, and the scanning circuit is suitable for driving multiple scanning lines of the LED array. The driving parameter determination circuit is coupled to the control circuit to provide the driving parameter. The driving parameter determination circuit dynamically adjusts the driving parameter for a target LED in the LED array according to a grayscale value of the target LED.

14 Claims, 9 Drawing Sheets

(56) References Cited

U.S. PATENT DOCUMENTS

| | | | | |
|---|---|---|---|---|
| 2005/0264499 | A1* | 12/2005 | Kim | G09G 3/3216 345/76 |
| 2006/0227078 | A1* | 10/2006 | Shino | G09G 3/2092 345/75.2 |
| 2010/0020114 | A1* | 1/2010 | Lee | G09G 3/3688 345/690 |
| 2010/0253709 | A1* | 10/2010 | Kobayashi | G09G 3/2007 345/690 |
| 2019/0172384 | A1 | 6/2019 | Nonomura | |
| 2019/0287472 | A1* | 9/2019 | Yang | G09G 3/3618 |
| 2020/0335027 | A1* | 10/2020 | Kim | G09G 3/20 |
| 2021/0256898 | A1 | 8/2021 | Kim | |
| 2022/0398973 | A1* | 12/2022 | Lin | G09G 3/2014 |

FOREIGN PATENT DOCUMENTS

| | | |
|---|---|---|
| CN | 113450704 | 9/2021 |
| TW | 201926303 | 7/2019 |

* cited by examiner

DISPLAY DRIVING INTEGRATED CIRCUIT AND DRIVING PARAMETER ADJUSTMENT METHOD THEREOF

CROSS-REFERENCE TO RELATED APPLICATION

This application claims the priority benefit of U.S. Provisional Application No. 63/293,825, filed on Dec. 26, 2021. The entirety of the above-mentioned patent application is hereby incorporated by reference herein and made a part of this specification.

BACKGROUND

Technical Field

The disclosure relates to an integrated circuit, and more particularly to a display driving integrated circuit and a driving parameter adjustment method thereof.

Description of Related Art

Generally speaking, the driving parameters of the display driving integrated circuit to a display panel are a fixed set of parameters. The general display driving integrated circuit does not dynamically adjust the driving parameter due to changes in the current input grayscale value (current pixel data). However, in fact, the optimized driving parameter for high grayscale may not be the optimized driving parameter for low grayscale.

SUMMARY

The disclosure provides a display driving integrated circuit and a driving parameter adjustment method thereof to dynamically adjust a driving parameter for each light emitting diode of a light emitting diode array.

In an embodiment of the disclosure, the display driving integrated circuit includes a control circuit and a driving parameter determination circuit. The control circuit is used to control a current driving circuit and a scanning circuit according to at least one driving parameter. The current driving circuit is suitable for driving multiple driving lines of a light emitting diode array, and the scanning circuit is suitable for driving multiple scanning lines of the light emitting diode array. The driving parameter determination circuit is coupled to the control circuit to provide the at least one driving parameter. The driving parameter determination circuit dynamically adjusts the at least one driving parameter for a target light emitting diode in the light emitting diode array according to a grayscale value of the target light emitting diode.

In an embodiment of the disclosure, the driving parameter adjustment method includes the following steps. At least one driving parameter for a target light emitting diode in a light emitting diode array is dynamically adjusted according to a grayscale value of the target light emitting diode. A current driving circuit and a scanning circuit are controlled according to the at least one driving parameter. The current driving circuit is suitable for driving multiple driving lines of the light emitting diode array, and the scanning circuit is suitable for driving multiple scanning lines of the light emitting diode array.

Based on the above, the display driving integrated circuit according to the embodiment of the disclosure may inspect the grayscale value of each light emitting diode (pixel) of the light emitting diode array, and then dynamically adjust the driving parameter of each light emitting diode according to the grayscale value of each light emitting diode. For example, when the grayscale value of a certain light emitting diode (referred to as a target light emitting diode here) of the light emitting diode array is a first grayscale value, the driving parameter determination circuit may adjust the driving parameter for the target light emitting diode to a first configuration. When the grayscale value of the target light emitting diode is a second grayscale value different from the first grayscale value, the driving parameter determination circuit may adjust the driving parameter for the target light emitting diode to a second configuration different from the first configuration. Therefore, the display driving integrated circuit may dynamically adjust the optimized driving parameter according to the level of grayscale.

In order for the features and advantages of the disclosure to be more comprehensible, the following specific embodiments are described in detail in conjunction with the drawings.

DETAILED DESCRIPTION OF DISCLOSED EMBODIMENTS

Figure 1:
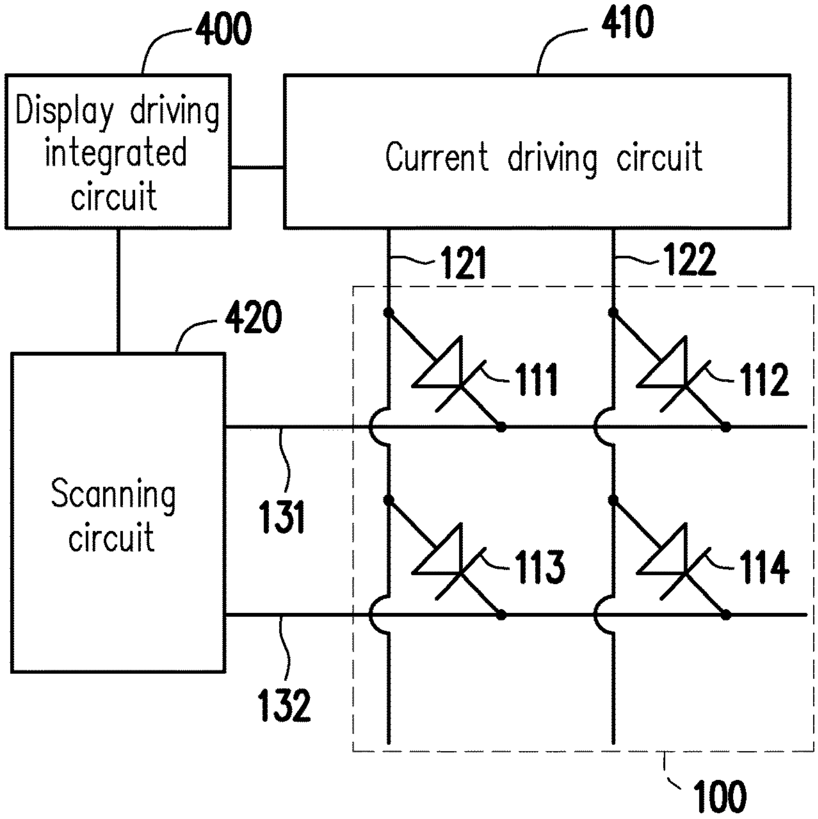
FIG. 1 is a schematic diagram of a circuit block of a display driving system according to an embodiment of the disclosure.

The term "coupling (or connection)" used in the entire specification (including the claims) of the present application may refer to any direct or indirect connection means. For example, if a first device is described as being coupled (or connected) to a second device, it should be interpreted that the first device may be directly connected to the second device or the first device may be indirectly connected to the second device through another device or certain connection means. Terms such as "first" and "second" mentioned in the entire specification (including the claims) of the present application are used to name the elements or to distinguish between different embodiments or ranges, but not to limit the upper limit or the lower limit of the number of elements or to limit the sequence of the elements. In addition, wherever possible, elements/components/steps using the same reference numerals in the drawings and embodiments represent the same or similar parts. Related descriptions of the elements/components/steps using the same reference numerals or using the same terminologies may be cross-referenced.

FIG. 1 is a schematic diagram of a circuit block of a display driving system according to an embodiment of the disclosure. The display driving system shown in FIG. 1 includes a light emitting diode (LED) array 100, a display driving integrated circuit 400, a current driving circuit 410, and a scanning circuit 420. In the embodiment shown in FIG. 1, the display driving integrated circuit 400, the current driving circuit 410, and the scanning circuit 420 may be different integrated circuits. According to the actual design, in some embodiments, the current driving circuit 410 and the scanning circuit 420 may be integrated into the same integrated circuit, and the display driving integrated circuit 400 may be another integrated circuit. In other embodiments, one of the current driving circuit 410 and the scanning circuit 420 may be integrated into the display driving integrated circuit 400, and the other one of the current driving circuit 410 and the scanning circuit 420 may be another integrated circuit. In still other embodiments, the current driving circuit 410 and the scanning circuit 420 may be both integrated into the display driving integrated circuit 400.

The LED array 100 shown in FIG. 1 includes multiple LEDs (for example, LEDs 111, 112, 113, and 114 shown in FIG. 1), multiple driving lines (for example, driving lines 121 and 122 shown in FIG. 1), and multiple scanning lines (for example, scanning lines 131 and 132 shown in FIG. 1). The LED array 100 shown in FIG. 1 uses a 2*2 array as an illustrative example. Based on the related description of the LED array 100, the LED array 100 may be analogized as an LED array of any dimension. According to the actual design, the LEDs 111 to 114 may be mini LEDs, micro LEDs, or other LEDs.

The current driving circuit 410 may drive multiple driving lines, such as the driving lines 121 and 122, of the LED array 100. The scanning circuit 420 may drive multiple scanning lines, such as the scanning lines 131 and 132, of the LED array 100. In the embodiment shown in FIG. 1, the LED array 100 is a common cathode LED array. Based on the scanning timing of the scanning circuit 420 on the scanning lines 131 and 132, the current driving circuit 410 may synchronously output driving currents to different driving lines 121 and 122. Therefore, the current driving circuit 410 and the scanning circuit 420 may drive the LED array 100 to display an image. The embodiment does not limit the implementation details of the current driving circuit 410 and the scanning circuit 420. According to the actual design, in some embodiments, the current driving circuit 410 and the scanning circuit 420 may be conventional LED array driving circuits or other LED array driving circuits.

Figure 2:
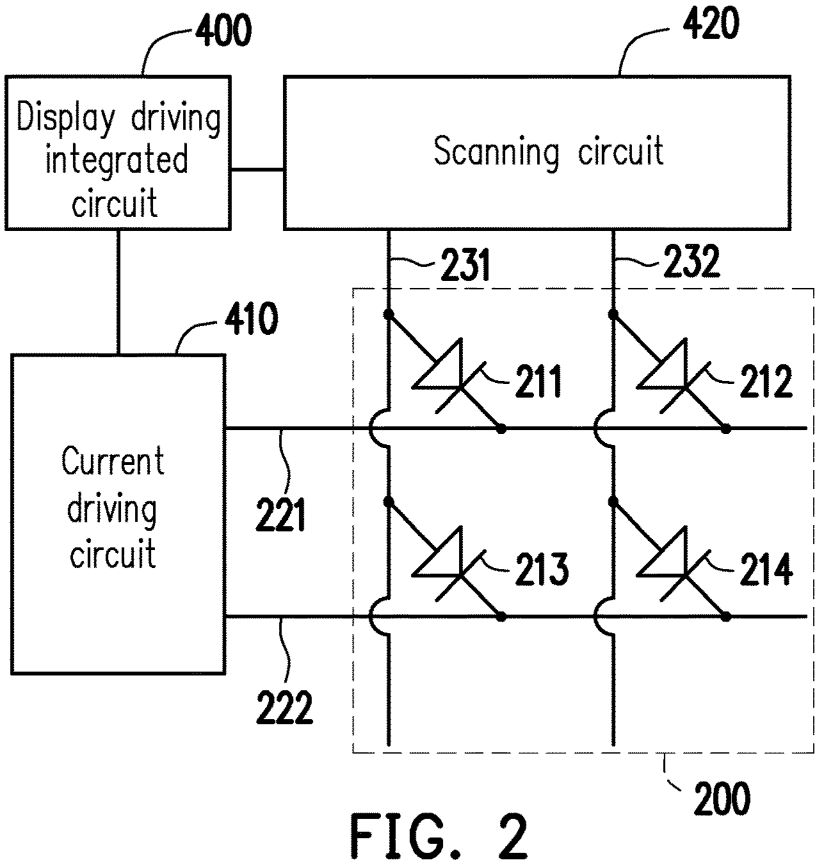
FIG. 2 is a schematic diagram of a circuit block of a display driving system according to another embodiment of the disclosure.

FIG. 2 is a schematic diagram of a circuit block of a display driving system according to another embodiment of the disclosure. The display driving system shown in FIG. 2 includes an LED array 200, a display driving integrated circuit 400, a current driving circuit 410, and a scanning circuit 420. The LED array 200, the display driving integrated circuit 400, the current driving circuit 410, and the scanning circuit 420 shown in FIG. 2 may be analogized with reference to the related description of the LED array 100, the display driving integrated circuit 400, the current driving circuit 410, and the scanning circuit 420 shown in FIG. 1, so there will be no repetition.

In the embodiment shown in FIG. 2, the LED array 200 includes multiple LEDs (for example, LEDs 211, 212, 213, and 214 shown in FIG. 2), multiple driving lines (for example, driving lines 221 and 222 shown in FIG. 2), and multiple scanning lines (for example, scanning lines 231 and 232 shown in FIG. 2). The LED array 200 shown in FIG. 2 uses a 2*2 array as an illustrative example. Based on the related description of the LED array 200, the LED array 200 may be analogized as an LED array of any dimension. According to the actual design, the LEDs 211 to 214 may be mini LEDs, micro LEDs, or other LEDs. The LED array 200 is a common anode LED array. The current driving circuit 410 may drive multiple driving lines, such as the driving lines 221 and 222, of the LED array 200. The scanning circuit 420 may drive multiple scanning lines, such as the scanning lines 231 and 232, of the LED array 200. Based on the scanning timing of the scanning circuit 420 on the scanning lines 231 and 232, the current driving circuit 410 may synchronously output driving currents to different driving lines 221 and 222. Therefore, the current driving circuit 410 and the scanning circuit 420 may drive the LED array 200 to display an image.

In the embodiment shown in FIG. 1 or FIG. 2, the display driving integrated circuit 400 may control the current driving circuit 410 and the scanning circuit 420 according to one or more driving parameters. According to the actual design, in some embodiments, the driving parameter may include a pulse amplitude modulation (PAM) multiplier parameter, a pulse width modulation (PWM) multiplier parameter, a slew rate parameter, a width compensation level parameter, a pulse delay parameter, a refresh rate setting parameter, a precharge voltage parameter, and/or other driving parameters. According to different grayscale values of different LEDs (pixels), the display driving integrated circuit 400 may dynamically adjust the driving parameters for different LEDs (pixels).

In the following description, the "target LED" may be any LED in an LED array. For example, the "target LED" may be the LED 111 in the LED array 100 shown in FIG. 1. The other LEDs 112 to 114 shown in FIG. 1 may be analogized with reference to the related description of the LED 111. For another example, the "target LED" may be the LED 211 in the LED array 200 shown in FIG. 2. The other LEDs 212 to 214 shown in FIG. 2 may be analogized with reference to the related description of the LED 211.

Figure 3:
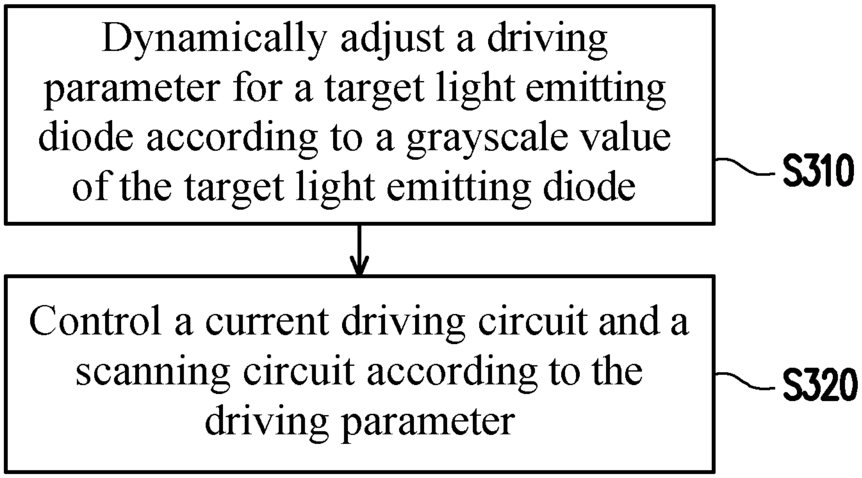
FIG. 3 is a schematic flowchart of a driving parameter adjustment method of a display driving integrated circuit according to an embodiment of the disclosure.

FIG. 3 is a schematic flowchart of a driving parameter adjustment method of a display driving integrated circuit according to an embodiment of the disclosure. Please refer to FIG. 1 and FIG. 3 or refer to FIG. 2 and FIG. 3. In Step S310, the display driving integrated circuit 400 may dynamically adjust one or more driving parameters for a target LED in the LED array 100 (or 200) according to the grayscale value of the target LED. In Step S320, the display driving integrated circuit 400 may control the current driving circuit 410 and the scanning circuit 420 according to the driving parameter. For example, the driving parameter adjustment method may divide the range of the grayscale value into multiple intervals, wherein the intervals respectively correspond to different parameter levels (different configurations). The display driving integrated circuit 400 may dynamically adjust the driving parameter for the target LED according to the parameter level corresponding to the grayscale value of the target LED. By the configuration of multiple sets of parameters, the performance can be optimized according to the input grayscale value. The display driving integrated circuit 400 may have a built-in judgment mechanism to dynamically adjust the setting configuration of a key parameter according to a specific rule (according to different input grayscale values).

For example (but not limited to), based on the control of the display driving integrated circuit 400, each driving channel of the current driving circuit 410 may dynamically select one set from two sets (or more sets) of driving parameters according to different input grayscale values to adjust the driving parameter of its own driving channel. Therefore, the LED display driving integrated circuit can solve the issues of parameter adaptability and coupling. According to the actual design, in some embodiments, the driving parameter for the LED may include (but not limited to) a pulse amplitude modulation (PAM) multiplier parameter, a pulse width modulation (PWM) multiplier parameter, a slew rate parameter (channel opening and closing speeds), a pulse delay parameter (starting time of channel opening), a width compensation level parameter, a refresh rate setting parameter, a de-ghost/dummy time voltage, a precharge (dead time) voltage, and/or other driving parameters.

Figure 4:
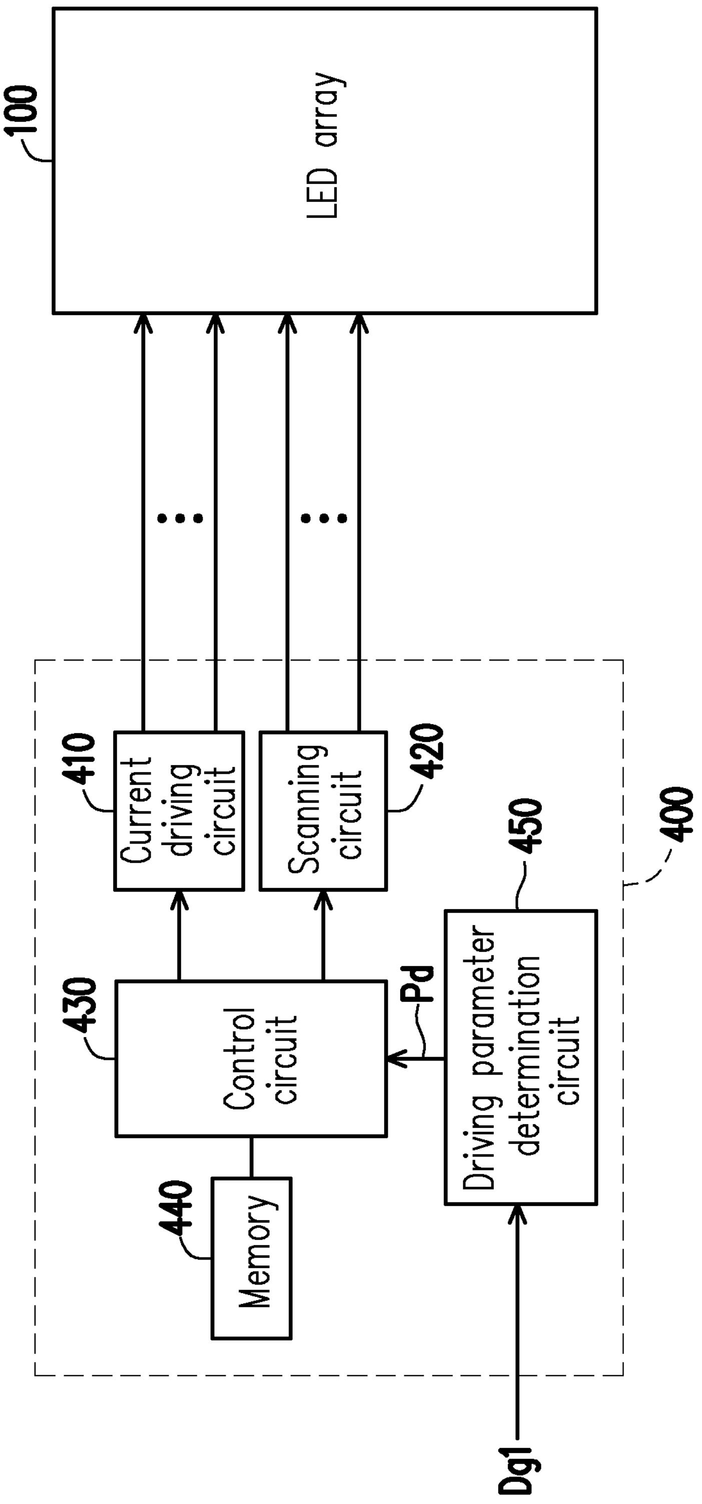
FIG. 4 is a schematic diagram of a circuit block of a display driving integrated circuit according to an embodiment of the disclosure.

FIG. 4 is a schematic diagram of a circuit block of a display driving integrated circuit according to an embodiment of the disclosure. For a display driving integrated circuit 400, a current driving circuit 410, and a scanning circuit 420 shown in FIG. 4, reference may be made to the related description of the display driving integrated circuit 400, the current driving circuit 410, and the scanning circuit 420 shown in FIG. 1, so there will be no repetition. In the embodiment shown in FIG. 4, the current driving circuit 410 and the scanning circuit 420 may be both integrated into the display driving integrated circuit 400.

The display driving integrated circuit 400 further includes a control circuit 430, a memory 440, and a driving parameter determination circuit 450. The control circuit 430 may control the current driving circuit 410 and the scanning circuit 420 according to one or more driving parameters Pd. According to different design requirements, the implementation of the control circuit 430 and/or the driving parameter determination circuit 450 may be in the form of hardware, firmware, software (that is, program), or a combination of multiple of the above three.

In terms of the form of hardware, the control circuit 430 and/or the driving parameter determination circuit 450 may be implemented as logic circuits on an integrated circuit. The related functions of the control circuit 430 and/or the driving parameter determination circuit 450 may be implemented in hardware using hardware description languages (for example, Verilog HDL or VHDL) or other suitable programming languages. For example, the related functions of the control circuit 430 and/or the driving parameter determination circuit 450 may be implemented in one or more controllers, microcontrollers, microprocessors, application-specific integrated circuits (ASICs), digital signal processors (DSPs), field programmable gate arrays (FPGAs), and/or various logic blocks, modules, and circuits in other processing units.

In terms of the form of software and/or firmware, the related functions of the control circuit 430 and/or the driving parameter determination circuit 450 may be implemented as programming codes. For example, the control circuit 430 and/or the driving parameter determination circuit 450 are implemented using general programming languages (for example, C, C++, or assembly language) or other suitable programming languages. The programming codes may be recorded/stored in a "non-transitory computer readable medium". In some embodiments, the non-transitory computer readable medium includes, for example, a read only memory (ROM), a semiconductor memory, a programmable logic circuit, and/or a storage device. A central processing unit (CPU), a controller, a microcontroller, or a microprocessor may read and execute the programming codes from the non-transitory computer readable medium, thereby implementing the related functions of the control circuit 430 and/or the driving parameter determination circuit 450.

The driving parameter determination circuit 450 is coupled to the control circuit 430 to provide the driving parameter Pd. The driving parameter determination circuit 450 may dynamically adjust the driving parameter Pd for a certain target LED (target pixel) in the LED array 100 according to a grayscale value Dg1 of the target LED. In some embodiments, the range of the grayscale value Dg1 may be divided into multiple intervals according to the actual design, wherein the intervals respectively correspond to different parameter levels. The driving parameter determination circuit 450 may dynamically adjust the driving parameter Pd for the target LED according to the parameter level corresponding to the grayscale value Dg1 of the target LED. For example, parameter 1 is used for very high grayscale, parameter 2 is used for medium high grayscale, parameter 3 is used for medium low grayscale, and parameter 4 is used for low grayscale. Therefore, based on the control of the control circuit 430, the current driving circuit 410 and/or the scanning circuit 420 may apply different driving parameters for LEDs (pixels) with different grayscale values.

Figure 5:
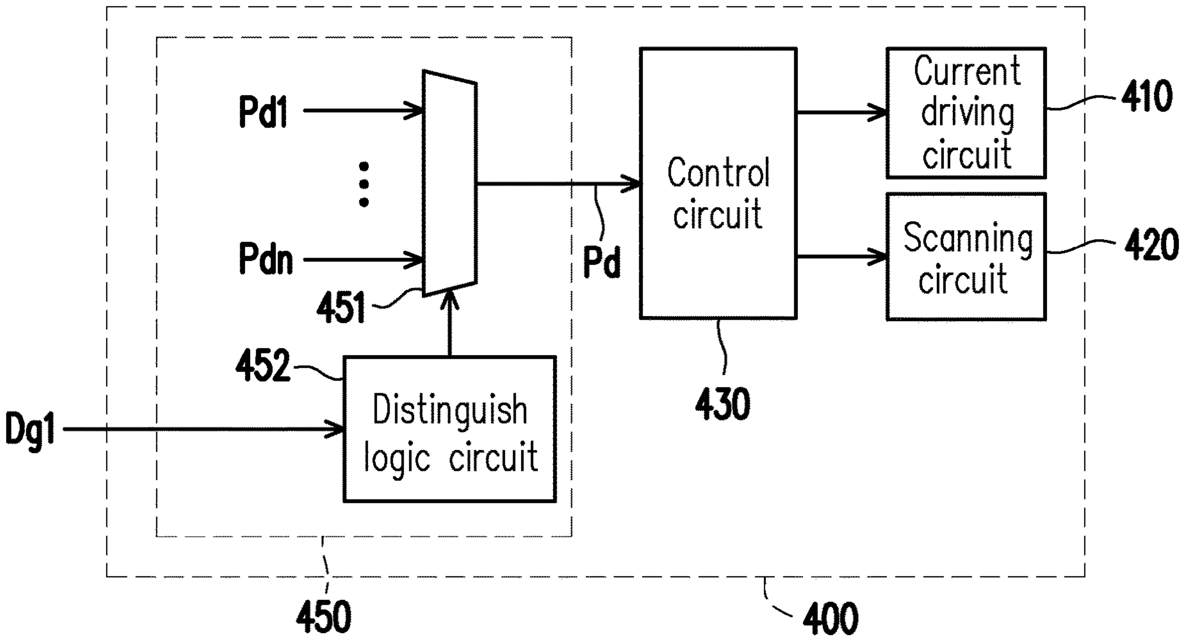
FIG. 5 is a schematic diagram of a circuit block of a driving parameter determination circuit according to an embodiment of the disclosure.

FIG. 5 is a schematic diagram of a circuit block of a driving parameter determination circuit 450 according to an embodiment of the disclosure. For a display driving integrated circuit 400, a current driving circuit 410, a scanning circuit 420, a control circuit 430, and the driving parameter determination circuit 450 shown in FIG. 5, reference may be made to the related description of the display driving integrated circuit 400, the current driving circuit 410, the scanning circuit 420, the control circuit 430, and the driving parameter determination circuit 450 shown in FIG. 4, so there will be no repetition. In the embodiment shown in FIG. 5, the driving parameter determination circuit 450 includes a multiplexer 451 and a distinguish logic circuit 452.

Multiple selection terminals of the multiplexer 451 are respectively coupled to different parameter values, such as n parameter values Pd1 to Pdn shown in FIG. 5, of the driving parameter Pd. A common terminal of the multiplexer 451 is coupled to the control circuit 430 to provide the driving parameter Pd. An output terminal of the distinguish logic circuit 452 is coupled to a control terminal of the multiplexer 451. The distinguish logic circuit 452 may control the multiplexer 451 according to the grayscale value Dg1 corresponding to a certain target LED in the LED array 100, so that the multiplexer 451 selects one of the parameter values Pd1 to Pdn as the driving parameter Pd applied to the target LED. Based on the dynamic change of the driving parameter Pd, the control circuit 430 may change the output characteristics of the current driving circuit 410 and the scanning circuit 420.

The actual content of the driving parameter Pd may be defined according to the actual design. For example, in some embodiments, the driving parameter Pd may include a pulse amplitude modulation (PAM) multiplier parameter, a pulse width modulation (PWM) multiplier parameter, a slew rate parameter (channel opening and off speed), a pulse delay parameter (starting time of channel opening), a width compensation level parameter, a refresh rate setting parameter, a de-ghost/dummy time voltage, a precharge (dead time) voltage, and/or other driving parameters. The following describes specific examples of “dynamically adjusting the driving parameter Pd applied to the target LED according to differences in the grayscale value Dg1 corresponding to the input of the target LED” with multiple embodiments.

In some embodiments, the driving parameter Pd includes a pulse amplitude modulation (PAM) multiplier parameter and a pulse width modulation (PWM) multiplier parameter. When the grayscale value Dg1 of the target LED falls within a “low grayscale interval”, the driving parameter determination circuit 450 may dynamically lower a PAM multiplier parameter applied to the target LED and dynamically raise a PWM multiplier parameter applied to the target LED. When the grayscale value Dg1 of the target LED falls within a “high grayscale interval”, the driving parameter determination circuit 450 may dynamically raise the PAM multiplier parameter applied to the target LED and dynamically lower the PWM multiplier parameter applied to the target LED.

The range of the grayscale value Dg1 may be divided into several intervals according to the actual design. For example, the following Table 1 is an example of grayscale intervals of the grayscale value Dg1. In the embodiment shown in Table 1, the range of the grayscale value Dg1 is assumed to be 1 to 2047, wherein grayscale values 1 to 8 are grouped into the “low grayscale interval”, grayscale values 9 to 31 are grouped into the “medium grayscale interval”, and grayscale values 32 to 2047 are grouped into the “high grayscale interval”. When the current input grayscale value of a target driving channel (that is, the grayscale value Dg1 of the target LED) falls within the interval of 32 to 2047 shown in Table 1, the PAM multiplier parameter and the PWM multiplier parameter (the driving parameter Pd applied to the target LED) of the target driving channel are both normal values (represented by multiplier “1” in Table 1).

TABLE 1

| Code | PAM multiple | PWM multiple |
|---|---|---|
| 1-8 | 1/4 | 4 |
| 9-31 | 1/2 | 2 |
| 32-2047 | 1 | 1 |

Figure 6A:
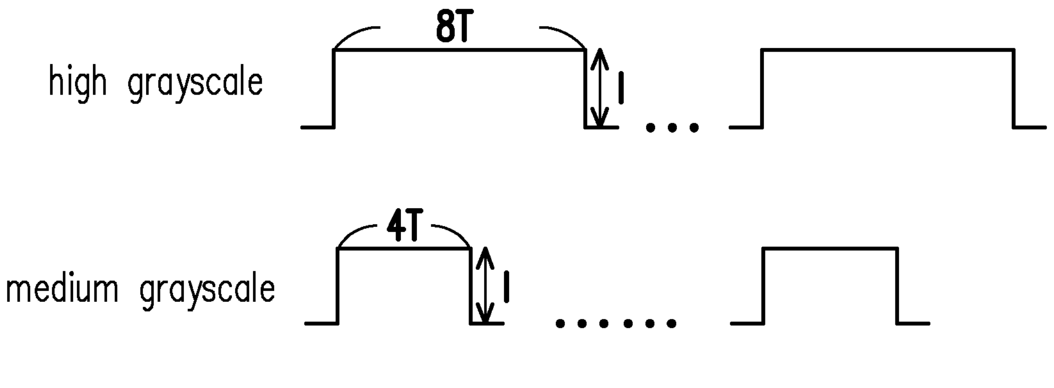
FIG. 6A (PRIOR ART)
FIG. 6A is a schematic diagram of a waveform of a driving current output by the current driving circuit in a case where the PAM multiplier parameter and the PWM multiplier parameter are fixed at "1".

FIG. 6A is a schematic diagram of a waveform of a driving current output by the current driving circuit 410 in a case where the PAM multiplier parameter and the PWM multiplier parameter are fixed at “1”. The horizontal axis of FIG. 6A represents time. In the example shown in FIG. 6A, regardless of whether the current input grayscale value of the target driving channel (i.e., the grayscale value Dg1 of the target LED) falls within the “high grayscale interval” (e.g., grayscale values 32-2047), “medium grayscale interval” (e.g., grayscale value 9~31) or “low grayscale interval” (e.g., grayscale value 1~8), the PAM multiplier parameter and the PWM multiplier parameter (the driving parameter Pd) are all fixed at “1”. The upper portion of FIG. 6A shows the waveform of the driving current output by the current driving circuit 410 when the current input grayscale value of the target driving channel (that is, the grayscale value Dg1 of the target LED) falls within the “high grayscale interval” (for example, the grayscale values 32 to 2047). Since the PAM multiplier parameter and the PWM multiplier parameter applied to the target LED are both “1”, the current driving circuit 410 may convert the grayscale value Dg1 into a driving current with a width of “8T” and an amplitude of “I”.

The lower portion of FIG. 6A shows the waveform of the driving current output by the current driving circuit 410 in a case where the PAM multiplier parameter and the PWM multiplier parameter (the driving parameter Pd) are fixed at “1” and when the current input grayscale value of the target driving channel (that is, the grayscale value Dg1 of the target LED) falls within the “medium grayscale interval” (for example, the grayscale values 9 to 31). Based on the PAM multiplier parameter and the PWM multiplier parameter being fixed at “1”, the current driving circuit 410 converts the grayscale value Dg1 into a driving current with a width of “4T” and an amplitude of “I”. For the prior art, regardless of the current grayscale value, the PAM multiplier parameter of the target driving channel is fixed, that is, the amplitude of the driving current is fixed at “I”.

Figure 6B:
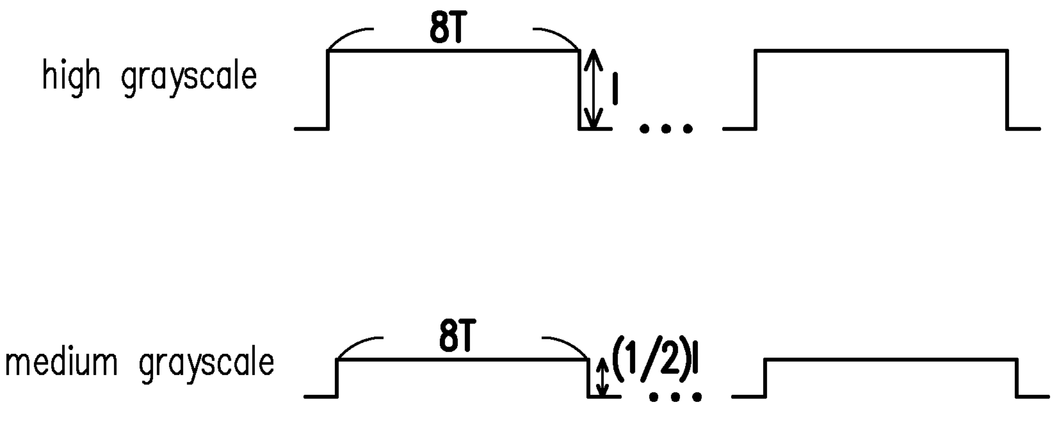
FIG. 6B is a schematic diagram of a waveform of a driving current output by a current driving circuit corresponding to a display driving integrated circuit dynamically adjusting a PAM multiplier parameter and a PWM multiplier parameter according to an embodiment of the disclosure.

For the embodiment of the disclosure, the display driving integrated circuit 400 may dynamically adjust the PAM multiplier parameter and the PWM multiplier parameter according to differences in the grayscale value Dg1. For example, FIG. 6B is a schematic diagram of a waveform of a driving current output by the current driving circuit 410 corresponding to the display driving integrated circuit 400 dynamically adjusting the PAM multiplier parameter and the PWM multiplier parameter (the driving parameter Pd) according to an embodiment of the disclosure. The horizontal axis of FIG. 6B represents time. The upper portion of FIG. 6B shows the waveform of the driving current output by the current driving circuit 410 when the current input grayscale value of the target driving channel (that is, the grayscale value Dg1 of the target LED) falls within the “high grayscale interval” (for example, the interval of 32 to 2047 shown in Table 1). Since the grayscale value Dg1 of the target LED falls within the range of 32 to 2047 shown in Table 1, the PAM multiplier parameter and the PWM multiplier parameter applied to the target LED are dynamically set to “1”. Based on the PAM multiplier parameter and the PWM multiplier parameter, the current driving circuit 410 may convert the grayscale value Dg1 into a driving current with a width of "8T" and an amplitude of "I".

The lower portion of FIG. 6B shows the waveform of the driving current output by the current driving circuit 410 based on dynamically adjusting the PAM multiplier parameter and the PWM multiplier parameter in a case where the grayscale value Dg1 is assumed to be the same as the grayscale value corresponding to the lower portion of FIG. 6A. In the example shown in the lower portion of FIG. 6B, when the current input grayscale value of the target driving channel (that is, the grayscale value Dg1 of the target LED) falls within the "medium grayscale interval" (for example, the interval of 9 to 31 shown in Table 1), the PAM multiplier parameter applied to the target LED is dynamically set to "½" and the PWM multiplier parameter is dynamically set to "2". Based on the PAM multiplier parameter and the PWM multiplier parameter, the current driving circuit 410 may convert the grayscale value Dg1 into a driving current with a width of "4T*2=8T" and an amplitude of "I*½=½".

The display driving integrated circuit 400 may provide a lower PAM multiplier parameter to lower grayscale to reduce the driving current output by the current driving circuit 410, thereby improving the image quality and the refresh rate. The display driving integrated circuit 400 may keep the original setting (the multiplier parameter of "1") for high grayscale. The display driving integrated circuit 400 may be matched with multi-stage parameter setting, so that the color temperature of different grayscales can be kept consistent, and the brightness linearity can also be maintained.

In other embodiments, the driving parameter Pd includes a slew rate parameter. The slew rate parameter may determine the channel opening speed and the channel closing speed of the driving channel of the current driving circuit 410. When the grayscale value Dg1 of the target LED falls within the "low grayscale interval", the driving parameter determination circuit 450 may dynamically speed up the slew rate parameter applied to the target LED. When the grayscale value Dg1 of the target LED falls within the "high grayscale interval", the driving parameter determination circuit 450 may dynamically slow down the slew rate parameter applied to the target LED.

The following Table 2 is an example of the range of the grayscale value Dg1 being divided into several intervals. Compared with the embodiment shown in Table 1, in the embodiment shown in Table 2, the range of the grayscale value Dg1 is also assumed to be 1 to 2047, wherein grayscale values 1 to 8 are grouped into the "low grayscale interval", grayscale values 9 to 31 are grouped into the "medium grayscale interval", and grayscale values 32 to 2047 are grouped into the "high grayscale interval". When the current input grayscale value of the target driving channel (that is, the grayscale value Dg1 of the target LED) falls within the range of 32 to 2047 shown in Table 2, the channel opening speed and the channel closing speed of the target driving channel are both "slow". When the current input grayscale value of the target driving channel falls within the range of 9 to 31 shown in Table 2, the channel opening speed and the channel closing speed of the target driving channel are both "normal". When the current input grayscale value of the target driving channel falls within the range of 1 to 8 shown in Table 2, the channel opening speed and the channel closing speed of the target driving channel are both "fast".

TABLE 2

| Code | Channel opening speed | Channel closing speed |
|---|---|---|
| 1-8 | Fast | Fast |
| 9-31 | Normal | Normal |
| 32-2047 | Slow | Slow |

Figure 7A:
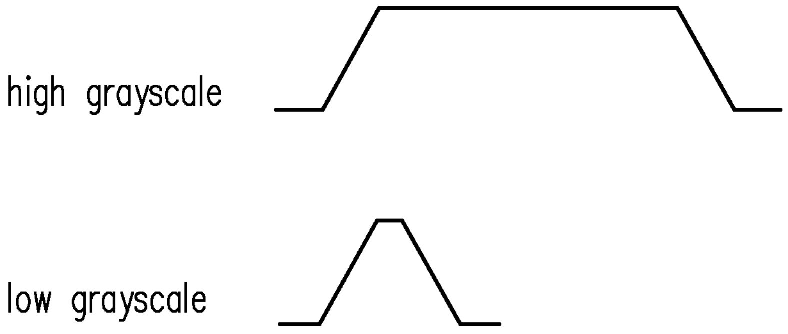
FIG. 7A (PRIOR ART)
FIG. 7A and FIG. 7B are schematic diagrams of waveforms of a driving current of a target driving channel according to the prior art.
Figure 7B:
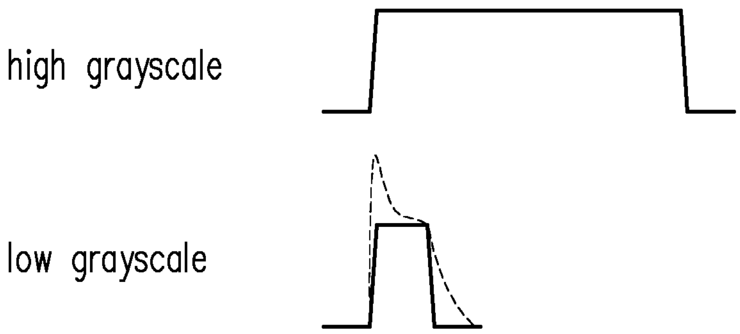
FIG. 7B (PRIOR ART)

FIG. 7A and FIG. 7B are schematic diagrams of waveforms of a driving current of a target driving channel according to the prior art. The horizontal axis of FIG. 7A and FIG. 7B represents time. The upper portions of FIG. 7A and FIG. 7B show the waveforms of the driving current converted from the current input grayscale value when the current input grayscale value falls within the "high grayscale interval" (for example, the grayscale values 32 to 2047). The lower portions of FIG. 7A and FIG. 7B show the waveforms of the driving current converted from the current input grayscale value when the current input grayscale value falls within the "low grayscale interval" (for example, the grayscale values 1 to 8). For the prior art, regardless of the current input grayscale value, the channel opening speed and the channel closing speed (the slew rate parameter) of the target driving channel are both fixed.

FIG. 7A shows the channel opening speed and the channel closing speed of the target driving channel being both fixedly set to "slow" in the prior art. The upper portion of FIG. 7A shows the waveforms of the driving current converted from the current input grayscale value when the current input grayscale value falls within the "high grayscale interval". The lower portion of FIG. 7A shows the waveforms of the driving current converted from the current input grayscale value when the current input grayscale value falls within the "low grayscale interval". For the "high grayscale interval", "the channel opening speed and the channel closing speed being set to slow" can reduce the influence of coupling effect. However, for the "low grayscale interval", "the channel opening speed and the channel closing speed being set to slow" causes the driving current to be insufficient (resulting in the LED being too dark).

FIG. 7B shows the channel opening speed and the channel closing speed of the target driving channel being both fixedly set to "fast" in the prior art. The upper portion of FIG. 7B shows the waveforms of the driving current converted from the current input grayscale value when the current input grayscale value falls within the "high grayscale interval". The lower portion of FIG. 7B shows the waveforms of the driving current converted from the current input grayscale value when the current input grayscale value falls within the "low grayscale interval". For the "low grayscale interval", "the channel opening speed and the channel closing speed being set to fast" can prevent insufficient driving current (to prevent the LED from being too dark). However, "the channel opening speed and the channel closing speed being set to fast" increases coupling effect. For example, the transition of a high grayscale signal of adjacent driving channels may cause coupling effect on a low grayscale signal (as shown by the dotted line in FIG. 7B).

The requirements for the slew rate parameter (the channel opening speed and the channel closing speed of a current driving channel) are often opposite for high grayscale and low grayscale. Low grayscale requires a faster current channel slew rate, so that the waveform of the driving current is complete, thereby improving the linearity. Conversely, high grayscale requires a slower current channel slew rate to reduce the amount of coupling.

Figure 8:
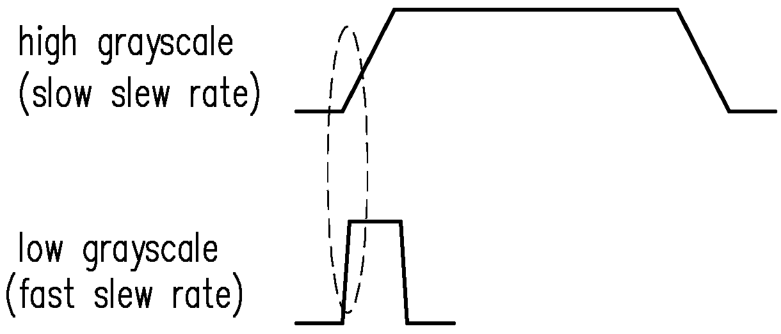
FIG. 8 is a schematic diagram of a waveform of a driving current output by a current driving circuit corresponding to a display driving integrated circuit dynamically adjusting a slew rate parameter according to another embodiment of the disclosure.

FIG. 8 is a schematic diagram of a waveform of a driving current output by the current driving circuit 410 corresponding to the display driving integrated circuit 400 dynamically adjusting the slew rate parameter (the driving parameter Pd) according to another embodiment of the disclosure. The horizontal axis of FIG. 8 represents time. The upper portion of FIG. 8 shows the waveform of the driving current output by the current driving circuit 410 when the current input grayscale value falls within the "high grayscale interval" (for example, the grayscale values of 32 to 2047 shown in Table 2). The lower portion of FIG. 8 shows the waveform of the driving current output by the current driving circuit 410 when the current input grayscale value of the target driving channel falls within the "low grayscale interval" (for example, the grayscale values of 1 to 8 shown in Table 2).

For the embodiment of the disclosure, the display driving integrated circuit 400 may dynamically adjust the slew rate of the current channel of the current driving circuit 410, that is, dynamically adjust the channel opening speed and the channel closing speed of the target driving channel according to differences in the grayscale value Dg1. For example, as shown in the lower portion of FIG. 8, when the current input grayscale value (that is, the grayscale value Dg1 of the target LED) falls within the "low grayscale interval" (for example, the range of 1 to 8 shown in Table 2), the display driving integrated circuit 400 may dynamically adjust the channel opening speed and the channel closing speed of the target driving channel to "fast" according to the current input grayscale value. As shown in the upper portion of FIG. 8, when the current input grayscale value falls within the "high grayscale interval" (for example, the range of 32 to 2047 shown in Table 2), the display driving integrated circuit 400 may dynamically adjust the channel opening speed and the channel closing speed of the target driving channel to "slow" according to the current input grayscale value.

In yet other embodiments, the driving parameter Pd includes a width compensation level parameter. When the grayscale value Dg1 of the target LED falls within the "low grayscale interval", the driving parameter determination circuit 450 may dynamically decrease the width compensation level parameter applied to the target LED. When the grayscale value Dg1 of the target LED falls within the "high grayscale interval", the driving parameter determination circuit 450 may dynamically increase the width compensation level parameter applied to the target LED.

Figure 9:
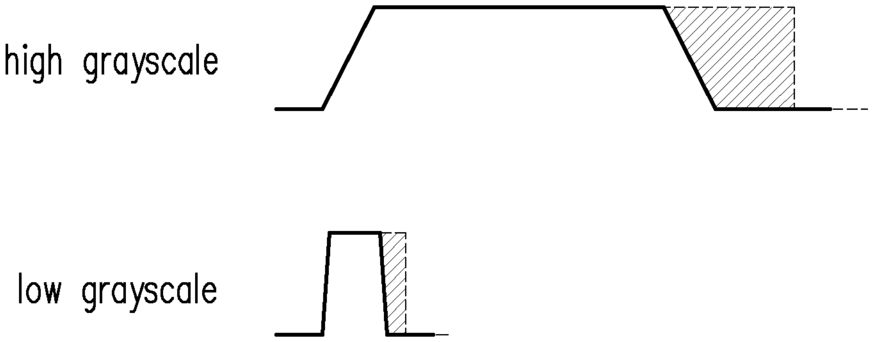
FIG. 9 is a schematic diagram of a waveform of a driving current output by a current driving circuit corresponding to a display driving integrated circuit dynamically adjusting a width compensation level parameter according to an embodiment of the disclosure.

FIG. 9 is a schematic diagram of a waveform of a driving current output by the current driving circuit 410 corresponding to the display driving integrated circuit 400 dynamically adjusting the width compensation level parameter (the driving parameter Pd) according to an embodiment of the disclosure. The horizontal axis of FIG. 9 represents time. The slashed bottom of FIG. 9 represents "width compensation", that is, the difference between the original waveform without width compensation and the width compensated waveform. The time length of the slashed bottom in FIG. 9 can be regarded as the "width compensation level". The upper portion of FIG. 9 shows the waveform of the driving current output by the current driving circuit 410 when the current input grayscale value falls within the "high grayscale interval". High grayscales can be dynamically set to large width compensation levels. The lower portion of FIG. 9 shows the waveform of the driving current output by the current driving circuit 410 when the current input grayscale value falls within the "low grayscale interval". Low grayscales can be dynamically set as small width compensation levels. The display driving integrated circuit 400 may separately set the width compensation level of low grayscale and the width compensation level of high grayscale to adjust the color coordinates and the brightness of high and low grayscale breakpoints, so that the chromaticity is consistent, thereby ensuring the brightness linearity. In response to different width compensation levels of the driving current, the display driving integrated circuit 400 may also synchronously adjust the time of a scanning signal.

In further embodiments, the driving parameter Pd includes a pulse delay parameter. The pulse delay parameter may determine the starting time of the driving channel opening (that is, the phase of a driving pulse). When the grayscale value Dg1 of the target LED falls within the "low grayscale interval", the driving parameter determination circuit 450 may dynamically adjust the pulse delay parameter applied to the target LED to a first delay time. When the grayscale value Dg1 of the target LED falls within the "high grayscale interval", the driving parameter determination circuit 450 may dynamically adjust the pulse delay parameter applied to the target LED to a second delay time different from the first delay time.

Figure 10A:
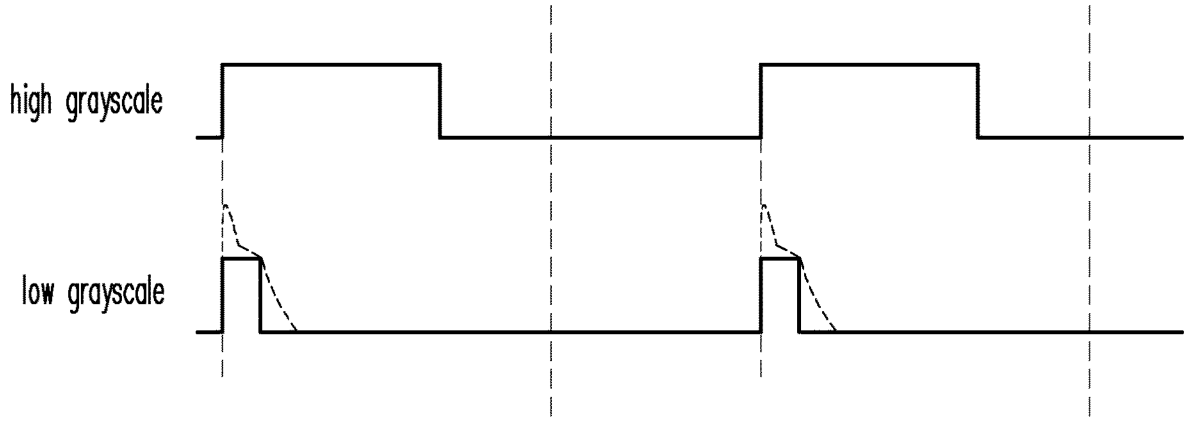
FIG. 10A (PRIOR ART)
FIG. 10A is a schematic diagram of current waveforms output by the current driving circuit in a case where the starting time (the pulse delay parameter) of channel opening of the target driving channel is fixed at the same phase.

FIG. 10A is a schematic diagram of current waveforms output by the current driving circuit in a case where the starting time (the pulse delay parameter) of channel opening of the target driving channel is fixed at the same phase. The horizontal axis of FIG. 10A represents time. The upper portion of FIG. 10A shows the waveform of the driving current output by the current driving circuit 410 when the current input grayscale value of the target driving channel (that is, the grayscale value Dg1 of the target LED) falls within the "high grayscale interval". The lower portion of FIG. 10A shows the waveform of the driving current output by the current driving circuit 410 when the current input grayscale value falls within the "low grayscale interval" in a case where the pulse delay parameter is fixed. For the prior art, regardless of the current input grayscale value, the starting time (the pulse delay parameter) of channel opening of the target driving channel is fixed at the same phase. That is, the starting time of a driving current pulse of low grayscale shown in the lower portion of FIG. 10A is the same as the starting time of a driving current pulse of high grayscale shown in the upper portion of FIG. 10A. Therefore, a high grayscale pulse (for example, the pulse shown in the upper portion of FIG. 10A) and a low grayscale pulse (for example, the pulse shown in the lower portion of FIG. 10A) may cause coupling effects to each other. For example, the transition of a high grayscale signal of adjacent driving channels may cause coupling effect on a low grayscale signal (as shown by the dotted line in the lower portion of FIG. 10A).

Figure 10B:
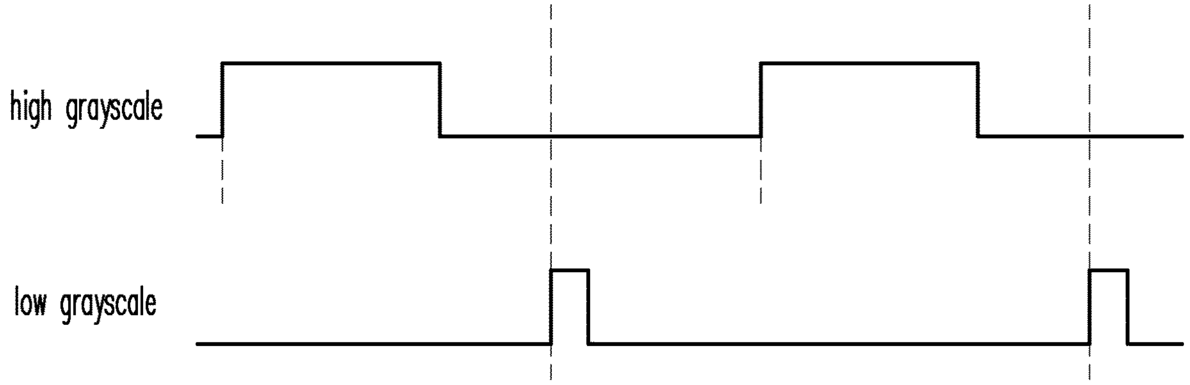
FIG. 10B is a schematic diagram of current waveforms of outputting a driving current at different starting times of channel opening according to an embodiment of the disclosure.

For the embodiment of the disclosure, the display driving integrated circuit 400 may dynamically adjust the starting time (the pulse delay parameter) of channel opening according to differences in the grayscale value Dg1. For example, FIG. 10B is a schematic diagram of current waveforms of outputting a driving current at different starting times of channel opening according to an embodiment of the disclosure. The horizontal axis of FIG. 10B represents time. The upper portion of FIG. 10B shows the waveform of the driving current output by the current driving circuit 410 when the current input grayscale value of the target driving channel (that is, the grayscale value Dg1 of the target LED) falls within the "high grayscale interval". The lower portion of FIG. 10B shows the waveform of the driving current output by the current driving circuit 410 based on dynamically adjusting the pulse delay parameter in a case where the grayscale value Dg1 is assumed to be the same as the grayscale value corresponding to the lower portion of FIG.

10A. The display driving integrated circuit 400 may stagger the starting time of low grayscale channel opening and the starting time of high grayscale channel opening from each other to achieve different channel opening for different grayscale. "The starting times of channel opening being staggered from each other" can temporally suppress coupling effect between the high grayscale pulse (for example, the pulse shown in the upper portion of FIG. 10B) and the low grayscale pulse (for example, the pulse shown in the lower portion of FIG. 10B). In response to the movement of the starting time of channel opening of the driving current, the scanning circuit 420 may also synchronously adjust the time of the scanning signal.

In other embodiments, the driving parameter Pd includes a refresh rate setting parameter. When the grayscale value Dg1 of the target LED falls within the "low grayscale interval", the driving parameter determination circuit 450 may dynamically increase the refresh rate setting parameter applied to the target LED. When the grayscale value Dg1 of the target LED falls within the "high grayscale interval", the driving parameter determination circuit 450 may dynamically decrease the refresh rate setting parameter applied to the target LED.

For the prior art, regardless of the current input grayscale value, the refresh rate setting parameter (the driving parameter) of the target driving channel is fixed. It is assumed that the refresh rate setting parameter of the target driving channel being fixedly set to "high" in the prior art. For the "high grayscale interval", "the refresh rate being set to high" affects the image quality. It is assumed that the refresh rate setting parameter of the target driving channel being fixedly set to "low" in the prior art. Although the "low refresh rate setting" can improve the image quality for the "high grayscale interval", the "low refresh rate setting" for the "low grayscale interval" causes the blanking time (that is, the time of the LED not emitting light) to be too long. That is, low grayscale encounters the issue of the refresh rate being too low.

The requirements for the refresh rate settings of high grayscale and low grayscale are often opposite. Low grayscale requires a high refresh rate setting. Conversely, high grayscale requires a low refresh rate setting. In the embodiment of the disclosure, the display driving integrated circuit 400 may dynamically adjust the refresh rate setting parameter according to differences in the grayscale value Dg1.

In an embodiment of the present invention, the display driving integrated circuit 400 can dynamically adjust the refresh rate setting parameter (the driving parameter Pd) according to the current input grayscale value. When the current input grayscale value falls within the "high grayscale interval", the display driving integrated circuit 400 may dynamically adjust the refresh rate setting parameter of the target driving channel to "low" according to the current input grayscale value. For the "high grayscale interval", the "low refresh rate setting" can improve the image quality. When the current input grayscale value falls within the "low grayscale interval", the display driving integrated circuit 400 may dynamically adjust the refresh rate setting parameter of the target driving channel to "high" according to the current input grayscale value to prevent the blanking time (that is, the time of the LED not emitting light) from being too long.

In other embodiments, the driving parameter Pd includes a precharge voltage parameter. When the grayscale value Dg1 of the target LED falls within the "low grayscale interval", the driving parameter determination circuit 450 may dynamically increase the precharge voltage parameter applied to the target LED. When the grayscale value Dg1 of the target LED falls within the "high grayscale interval", the driving parameter determination circuit 450 may dynamically decrease the precharge voltage parameter applied to the target LED.

Figure 11A:
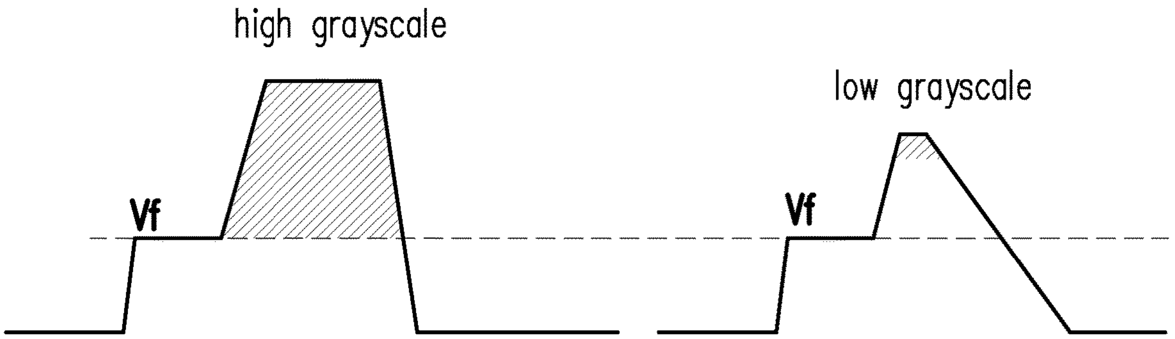
FIG. 11A (PRIOR ART)
FIG. 11A is a schematic diagram of a waveform of a driving current output by the current driving circuit in a case where a precharge voltage (the precharge voltage parameter) of the target driving channel is fixed at the same voltage level.

FIG. 11A is a schematic diagram of a waveform of a driving current output by the current driving circuit 410 in a case where a precharge voltage Vf (the precharge voltage parameter) of the target driving channel is fixed at the same voltage level. The horizontal axis of FIG. 11A represents time. The left portion of FIG. 11A shows the waveform of the driving current output by the current driving circuit 410 when the current input grayscale value falls within the "high grayscale interval". The right portion of FIG. 11A shows the waveform of the driving current output by the current driving circuit 410 when the current input grayscale value falls within the "low grayscale interval". For the prior art, regardless of the current input grayscale value, a precharge voltage Vf (the precharge voltage parameter) of the target driving channel is fixed at the same voltage level.

Figure 11B:
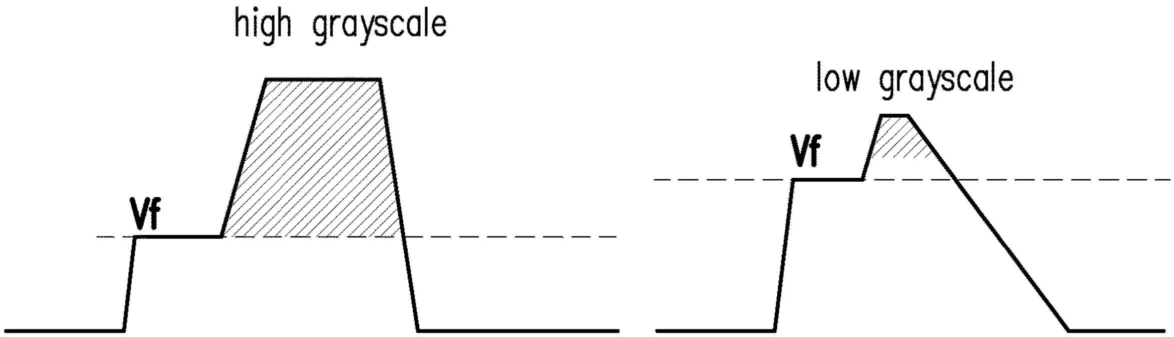
FIG. 11B is a schematic diagram of a waveform of a driving current output by a current driving circuit corresponding to a display driving integrated circuit dynamically adjusting a precharge voltage parameter according to an embodiment of the disclosure.

For the embodiment of the disclosure, the display driving integrated circuit 400 may dynamically adjust the precharge voltage parameter (the driving parameter) according to differences in the grayscale value Dg1. For example, FIG. 11B is a schematic diagram of a waveform of a driving current output by the current driving circuit 410 corresponding to the display driving integrated circuit 400 dynamically adjusting the precharge voltage parameter (the driving parameter Pd) according to an embodiment of the disclosure. The horizontal axis of FIG. 11B represents time. The left portion of FIG. 11B shows the waveform of the driving current output by the current driving circuit 410 when the current input grayscale value falls within the "high grayscale interval". The right portion of FIG. 11B shows the waveform of the driving current output by the current driving circuit 410 based on dynamically adjusting the precharge voltage parameter in a case where the grayscale value Dg1 is assumed to be the same as the grayscale value corresponding to the right portion of FIG. 11A. The display driving integrated circuit 400 may dynamically adjust different precharge voltages Vf according to the grayscale value Dg1. For example, when the grayscale value Dg1 falls within the "high grayscale interval", the precharge voltage Vf of the target driving channel of the current driving circuit 410 may be dynamically decreased (as shown in the left portion of FIG. 11B). When the grayscale value Dg1 falls within the "low grayscale interval", the precharge voltage Vf of the target driving channel of the current driving circuit 410 may be dynamically increased (as shown in the right portion of FIG. 11B).

In summary, the display driving integrated circuit 400 of the above embodiments may inspect the grayscale value of each LED (pixel) of the LED array 100, and then dynamically adjust the driving parameter Pd of each LED according to the grayscale value of each LED. For example, when the grayscale value of a certain LED (the target LED) of the LED array 100 is a first grayscale value, the driving parameter determination circuit 450 may adjust the driving parameter Pd for the target LED to a first configuration. When the grayscale value of the target LED is a second grayscale value different from the first grayscale value, the driving parameter determination circuit 450 may adjust the driving parameter Pd for the target LED to a second configuration different from the first configuration. Therefore, the display driving integrated circuit 400 may dynamically adjust the driving parameter Pd according to the level of the grayscale value Dg1.

Although the disclosure has been disclosed in the above embodiments, the embodiments are not intended to limit the disclosure. Persons skilled in the art may make some changes and modifications without departing from the spirit and scope of the disclosure. Therefore, the protection scope of the disclosure shall be defined by the appended claims.

What is claimed is:

1. A display driving integrated circuit, comprising:

a control circuit, configured to control a current driving circuit and a scanning circuit according to at least one driving parameter, wherein the current driving circuit is suitable for driving a plurality of driving lines of a light emitting diode array, and the scanning circuit is suitable for driving a plurality of scanning lines of the light emitting diode array; and a driving parameter determination circuit, coupled to the control circuit to provide the at least one driving parameter, wherein the driving parameter determination circuit dynamically adjusts the at least one driving parameter for a target light emitting diode in the light emitting diode array according to a grayscale value of the target light emitting diode, wherein the driving parameter determination circuit comprises:

a multiplexer, having a plurality of selection terminals respectively coupled to different parameter values of the at least one driving parameter, wherein a common terminal of the multiplexer is coupled to the control circuit to provide the at least one driving parameter; and a distinguish logic circuit, coupled to a control terminal of the multiplexer, wherein the distinguish logic circuit controls the multiplexer according to the grayscale value of the target light emitting diode, so that the multiplexer selects one of the parameter values as the at least one driving parameter of the target light emitting diode.

2. The display driving integrated circuit according to claim 1, wherein a range of the grayscale value is divided into a plurality of intervals, the intervals respectively correspond to different parameter levels, and the driving parameter determination circuit dynamically adjusts the at least one driving parameter for the target light emitting diode according to a parameter level corresponding to the grayscale value of the target light emitting diode.

3. The display driving integrated circuit according to claim 1, wherein the at least one driving parameter comprises a pulse amplitude modulation multiplier parameter and a pulse width modulation multiplier parameter, when the grayscale value of the target light emitting diode falls within a low grayscale interval, the driving parameter determination circuit dynamically decreases the pulse amplitude modulation multiplier parameter of the target light emitting diode and dynamically increases the pulse width modulation multiplier parameter of the target light emitting diode; and when the grayscale value of the target light emitting diode falls within a high grayscale interval, the driving parameter determination circuit dynamically increases the pulse amplitude modulation multiplier parameter of the target light emitting diode and dynamically decreases the pulse width modulation multiplier parameter of the target light emitting diode.

4. The display driving integrated circuit according to claim 1, wherein the at least one driving parameter comprises a slew rate parameter, when the grayscale value of the target light emitting diode falls within a low grayscale interval, the driving parameter determination circuit dynamically speeds up the slew rate parameter of the target light emitting diode; and when the grayscale value of the target light emitting diode falls within a high grayscale interval, the driving parameter determination circuit dynamically slows down the slew rate parameter of the target light emitting diode.

5. The display driving integrated circuit according to claim 1, wherein the at least one driving parameter comprises a width compensation level parameter, when the grayscale value of the target light emitting diode falls within a low grayscale interval, the driving parameter determination circuit dynamically decreases the width compensation level parameter of the target light emitting diode; and when the grayscale value of the target light emitting diode falls within a high grayscale interval, the driving parameter determination circuit dynamically increases the width compensation level parameter of the target light emitting diode.

6. The display driving integrated circuit according to claim 1, wherein the at least one driving parameter comprises a pulse delay parameter, when the grayscale value of the target light emitting diode falls within a low grayscale interval, the driving parameter determination circuit dynamically adjusts the pulse delay parameter of the target light emitting diode to a first delay time; and when the grayscale value of the target light emitting diode falls within a high grayscale interval, the driving parameter determination circuit dynamically adjusts the pulse delay parameter of the target light emitting diode to a second delay time different from the first delay time.

7. The display driving integrated circuit according to claim 1, wherein the at least one driving parameter comprises a refresh rate setting parameter, when the grayscale value of the target light emitting diode falls within a low grayscale interval, the driving parameter determination circuit dynamically increases the refresh rate setting parameter of the target light emitting diode; and when the grayscale value of the target light emitting diode falls within a high grayscale interval, the driving parameter determination circuit dynamically decreases the refresh rate setting parameter of the target light emitting diode.

8. The display driving integrated circuit according to claim 1, wherein the at least one driving parameter comprises a precharge voltage parameter, when the grayscale value of the target light emitting diode falls within a low grayscale interval, the driving parameter determination circuit dynamically increases the precharge voltage parameter of the target light emitting diode; and when the grayscale value of the target light emitting diode falls within a high grayscale interval, the driving parameter determination circuit dynamically decreases the precharge voltage parameter of the target light emitting diode.

9. The display driving integrated circuit according to claim 1, wherein the at least one driving parameter comprises at least one of a pulse amplitude modulation multiplier parameter, a pulse width modulation multiplier parameter, a slew rate parameter, a width compensation level parameter, a pulse delay parameter, a refresh rate setting parameter, and a precharge voltage parameter.

10. A driving parameter adjustment method, comprising:

dynamically adjusting at least one driving parameter for a target light emitting diode in a light emitting diode array according to a grayscale value of the target light emitting diode; and controlling a current driving circuit and a scanning circuit according to the at least one driving parameter, wherein the current driving circuit is suitable for driving a plurality of driving lines of the light emitting diode array, and the scanning circuit is suitable for driving a plurality of scanning lines of the light emitting diode array, wherein the at least one driving parameter comprises at least one of a pulse amplitude modulation multiplier parameter, a pulse width modulation multiplier parameter, and a width compensation level parameter,.

wherein the driving parameter adjustment method further comprises:

dynamically decreasing the pulse amplitude modulation multiplier parameter of the target light emitting diode and dynamically increasing the pulse width modulation multiplier parameter of the target light emitting diode when the grayscale value of the target light emitting diode falls within a low grayscale interval; and dynamically increasing the pulse amplitude modulation multiplier parameter of the target light emitting diode and dynamically decreasing the pulse width modulation multiplier parameter of the target light emitting diode when the grayscale value of the target light emitting diode falls within a high grayscale interval.

11. The driving parameter adjustment method according to claim 10, further comprising:

dividing a range of the grayscale value into a plurality of intervals, wherein the intervals respectively correspond to different parameter levels; and dynamically adjusting the at least one driving parameter for the target light emitting diode according to a parameter level corresponding to the grayscale value of the target light emitting diode.

12. A driving parameter adjustment method, comprising:

dynamically adjusting at least one driving parameter for a target light emitting diode in a light emitting diode array according to a grayscale value of the target light emitting diode; and controlling a current driving circuit and a scanning circuit according to the at least one driving parameter, wherein the current driving circuit is suitable for driving a plurality of driving lines of the light emitting diode array, and the scanning circuit is suitable for driving a plurality of scanning lines of the light emitting diode array, wherein the at least one driving parameter comprises a slew rate parameter, and the driving parameter adjustment method further comprises:

dynamically speeding up the slew rate parameter of the target light emitting diode when the grayscale value of the target light emitting diode falls within a low grayscale interval; and dynamically slowing down the slew rate parameter of the target light emitting diode when the grayscale value of the target light emitting diode falls within a high grayscale interval.

13. A driving parameter adjustment method, comprising:

dynamically adjusting at least one driving parameter for a target light emitting diode in a light emitting diode array according to a grayscale value of the target light emitting diode; and controlling a current driving circuit and a scanning circuit according to the at least one driving parameter, wherein the current driving circuit is suitable for driving a plurality of driving lines of the light emitting diode array, and the scanning circuit is suitable for driving a plurality of scanning lines of the light emitting diode array, wherein the driving parameter adjustment method further comprises:

dynamically decreasing the width compensation level parameter of the target light emitting diode when the grayscale value of the target light emitting diode falls within a low grayscale interval; and dynamically increasing the width compensation level parameter of the target light emitting diode when the grayscale value of the target light emitting diode falls within a high gray scale interval.

14. A driving parameter adjustment method, comprising:

dynamically adjusting at least one driving parameter for a target light emitting diode in a light emitting diode array according to a grayscale value of the target light emitting diode; and controlling a current driving circuit and a scanning circuit according to the at least one driving parameter, wherein the current driving circuit is suitable for driving a plurality of driving lines of the light emitting diode array, and the scanning circuit is suitable for driving a plurality of scanning lines of the light emitting diode array, wherein the at least one driving parameter comprises a pulse delay parameter, and the driving parameter adjustment method further comprises:

dynamically adjusting the pulse delay parameter of the target light emitting diode to a first delay time when the grayscale value of the target light emitting diode falls within a low grayscale interval; and dynamically adjusting the pulse delay parameter of the target light emitting diode to a second delay time different from the first delay time when the grayscale value of the target light emitting diode falls within a high grayscale interval.

* * * * *